(No Model.)

R. HERTZBERG.
SPITTOON.

No. 443,595. Patented Dec. 30, 1890.

Witnesses:
C. T. Belt
A. W. Bright

Inventor.
Rafael Hertzberg.
by Herbert W. T. Jenner.
Attorney.

THE NORRIS PETERS CO., PHOTO-LITHO., WASHINGTON, D. C.

UNITED STATES PATENT OFFICE.

RAFAËL HERTZBERG, OF HELSINGFORS, FINLAND.

SPITTOON.

SPECIFICATION forming part of Letters Patent No. 443,595, dated December 30, 1890.

Application filed July 10, 1890. Serial No. 358,256. (No model.)

*To all whom it may concern:*

Be it known that I, RAFAËL HERTZBERG, a subject of the Emperor of Russia, residing at Helsingfors, Finland, have invented certain new and useful Improvements in Spittoons; and I do hereby declare the following to be a full, clear, and exact description of the invention, such as will enable others skilled in the art to which it appertains to make and use the same.

It has been ascertained by recent scientific discoveries that the propagation of tuberculous bacillæ is greatly assisted by expectorations of invalids.

The object of this invention, therefore, is to prevent the expectorated matter from drying in the spittoon and consequently adhering thereto, while at the same time so long as it remains in the spittoon it is thoroughly covered up. These results are obtained by providing a suitable vessel, partly filled with water or other liquid, with a funnel-shaped cover turned with its apex inwardly, so that the liquid enters the latter and receives the expectorations, whereupon the funnel is removed and the matter thrown away, along with the water or liquid containing it, and, owing to the peculiar arrangement, the matter once taken up by the liquid is prevented from re-entering the funnel when the spittoon is again used.

On the annexed drawings there have been represented several arrangements for carrying out the present invention.

Figure 1:
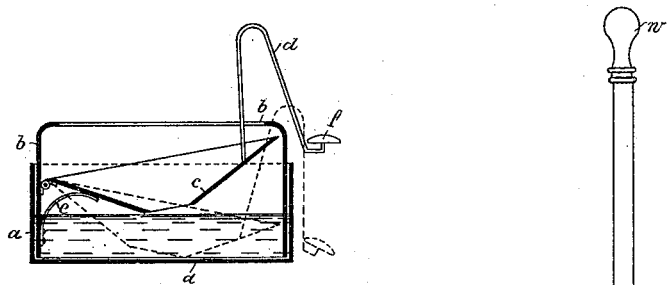
Figure 2:
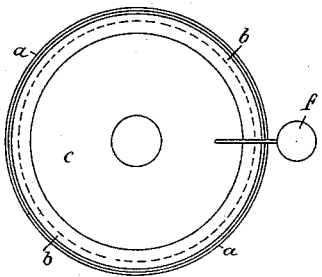
Figure 5:
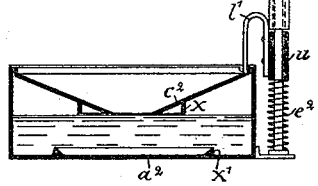
Figures 3, 4:
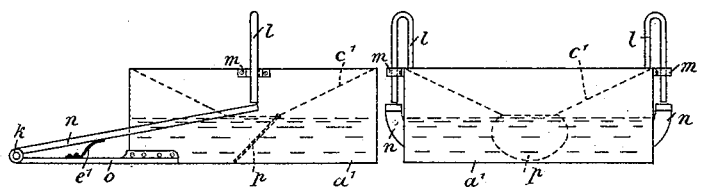

Figure 1 is a vertical section, and Fig. 2 is a plan view, showing the preferred form of the spittoon. Fig. 3 is a side view, and Fig. 4 is an end view, showing a modification. Fig. 5 is a side view, partly in section, showing a second modification.

In the first form, being illustrated by Figs. 1 and 2 in a vertical section and plan view, a hollow cylinder $b$ is removably arranged within a vessel $a$, also of cylindrical shape, open at the top, and partly filled with liquid. The upper edge of this hollow cylinder $b$ somewhat projects above the upper edge of the vessel and is slightly turned in, so that no water can be spilt unintentionally in carrying the spittoon from place to place. To the wall of the hollow cylinder $b$ is pivoted a funnel $c$, to which a spring $e$, also attached to the wall of the cylinder, imparts the tendency to swing upwardly, and this swinging motion of the funnel $c$ is so arranged that when it reaches the upper limit of its stroke, at which point it comes in contact with the hollow cylinder $b$, it gets entirely clear of the liquid contained in the vessel $a$. An upwardly-projecting arm or rod $d$ is also secured to the funnel $c$ and provided at its free end with a knob or head $f$. This arm $d$ is curved in such a manner that when depressed it places the funnel $c$ almost entirely immersed in the liquid. When it is desired to use the apparatus, the knob or head $f$ is pressed down with the foot, so that the funnel is moved downwardly, and liquid may enter the same through the opening provided for the purpose and wash away the expectorated matter. When the head $f$ is released, the spring $e$ forces the funnel $c$ upward again, and thereby causing the liquid to flow out of it, taking along with it the matter, which is thus concealed from view.

In another arrangement, illustrated by Figs. 3 and 4, representing two side views which show the apparatus in two directions, including an angle of ninety degrees, the funnel $c$ is retained in a vertical position within a vessel $a'$. For this purpose the funnel $c'$ is provided with arms $l$, which are bent outwardly over the edges of the vessel $a'$ in such a manner that the funnel $c'$ can be almost entirely immersed in the liquid contained in the said vessel $a'$. These arms $l$ move between two projections $m$, provided upon the external surface of the vessel $a'$, and serve to guide the funnel $c'$. Into the path of these arms $l$ project the free ends of arms $n$, which are jointed to the vessel $a'$, and to which a spring $e'$ imparts the tendency to swing upwardly. The junction of the arm to the vessel may be effected by means of other arms or links $o$, which are rigidly attached to the vessel $a'$, while they are connected to the spring-arms $n$ by a pivoted joint $k$. When the levers $n$ are pressed downward, the funnel $c'$ will be carried down by its own weight, and in thus descending fill with water. By releasing the arms $n$ the spring $e'$ is allowed to press them upward again, and the funnel $c'$ is emptied as above described.

In another example, illustrated by Fig. 5, representing partly a vertical section, partly a side view, an arm $t$ is fixed to a vessel $a^2$, which is partly filled with water or other liquid. A socket or sleeve $u$ is adjustably arranged on the said arm. This sleeve $u$ forms part of an arm $l'$, rigidly connected with the funnel $c^2$. By means of a spring $e^2$ a tendency to move upward is imparted to the said sleeve, and therefore also to the funnel $c^2$, while by means of a tube $r$, provided with a knob $w$ and passed over the arm or rod $t$, the funnel $c^2$ may be moved downward when required.

To prevent any matter that may be contained in the liquid from returning into the funnel when the apparatus is used frequently, a preferably perforated door or valve $p$ may be attached to the bottom of the funnel, as shown by Figs. 3 and 4. So long as the apparatus remains at rest this valve or door $p$ hangs down by virtue of its own weight, while by the descent of the funnel it is caused to rise, and by closing the bottom thereof prevents the matter from again entering it. For the same purpose a ring $x$ may be applied, as shown by Fig. 5, to the lower end of the funnel, while another ring $x'$ is provided at the bottom of the vessel. The top ring $x$ is arranged in proximity to the funnel-orifice, whereas the bottom ring $x'$ is situated near the edge of the vessel. The top ring, which may be perforated or not, as desired, is adapted to intercept the matter floating at the surface of the liquid, while the action of the bottom ring is this, that as the water issues from the funnel it enables the heavier particles to be washed past it, while during the return flow of the water into the funnel it prevents such matter from flowing back with the water. Such being the purpose to be accomplished, it is preferable that the bottom ring should be beveled inwardly, while having a vertical external surface. The arrangement may be reversed in such a manner that instead of the funnel being movable and the containing-vessel stationary, the latter may be movable and the funnel permanently held in position.

The devices herein described for intercepting the expectorated matter, besides being applicable to the various modifications of my improved spittoon, may also be applied to existing apparatus of the same class.

Having now particularly described the nature of my invention and in what manner the same is to be performed, I declare that what I claim, and desire to secure by Letters Patent of the United States, is—

1. In a spittoon, the combination, with an outer vessel adapted to hold liquid, of a depressible funnel supported in the upper part of the said vessel, a spring normally holding the funnel above the liquid in the vessel, and an arm for depressing the said funnel, substantially as set forth.

2. In a spittoon, the combination, with an outer vessel adapted to hold liquid, of an inner cylinder, a funnel pivoted to the cylinder, a spring secured to the cylinder and bearing against the under side of the funnel, and an arm for depressing the funnel below the level of the liquid, substantially as set forth.

In testimony whereof I affix my signature in presence of two witnesses.

RAFAËL HERTZBERG.

Witnesses:
JAMES CABLE,
L. VOLKWEIN.